United States Patent
Yu et al.

(10) Patent No.: US 12,511,660 B2
(45) Date of Patent: Dec. 30, 2025

(54) METHOD AND APPARATUS FOR CALCULATING CARBON EMISSION RESPONSE BASED ON CARBON EMISSION FLOWS

(71) Applicant: TSINGHUA UNIVERSITY, Beijing (CN)

(72) Inventors: Yanghao Yu, Beijing (CN); Yaowang Li, Beijing (CN); Ershun Du, Beijing (CN); Peng Wang, Beijing (CN); Yuliang Liu, Beijing (CN); Zhaoyi Wei, Beijing (CN); Ning Zhang, Beijing (CN); Chongqing Kang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 129 days.

(21) Appl. No.: 18/491,812

(22) Filed: Oct. 23, 2023

(65) Prior Publication Data
US 2024/0062225 A1 Feb. 22, 2024

Related U.S. Application Data

(63) Continuation of application No. PCT/CN2023/071312, filed on Jan. 9, 2023.

(30) Foreign Application Priority Data

Feb. 24, 2022 (CN) .......................... 202210171987.8

(51) Int. Cl.
*G06Q 30/018* (2023.01)
(52) U.S. Cl.
CPC ................................ *G06Q 30/018* (2013.01)

(58) Field of Classification Search
CPC ....... G06Q 30/018; G06Q 10/06; G06Q 50/06
See application file for complete search history.

(56) References Cited

U.S. PATENT DOCUMENTS

| | | | |
|---|---|---|---|
| 2009/0018884 A1* | 1/2009 | McConnell | G06Q 30/04 705/7.11 |
| 2012/0053848 A1* | 3/2012 | Doi | H02J 3/32 702/24 |

(Continued)

FOREIGN PATENT DOCUMENTS

| | | | |
|---|---|---|---|
| CN | 103218690 A | 7/2013 | |
| CN | 105913338 A | 8/2016 | |

(Continued)

OTHER PUBLICATIONS

Sadun, Lorenzo; "Distance is the definite integral of velocity"; published Nov. 14, 2012; YouTube.com; screenshot pp. 1-2, video timestamps 0:00-5:31 (Year: 2012).*

(Continued)

*Primary Examiner* — Emmett K. Walsh
*Assistant Examiner* — Michael C Moroney

(57) ABSTRACT

The present disclosure provides a method and apparatus for calculating carbon emission response based on carbon emission flows. The method includes: calculating a total carbon flow rate of a power system from a carbon flow rate of each of carbon meter users, the carbon flow rate being obtained based on a carbon emission flow of the carbon meter user; determining whether the total carbon flow rate is greater than a carbon emission response threshold; and calculating, in response to determining that the total carbon flow rate is greater than the carbon emission response threshold, a target carbon emission reduction of one or more of the carbon meter users during a carbon emission response period based on target carbon emission response demand, and initiating a (Continued)

carbon emission response based on the target carbon emission reduction.

12 Claims, 4 Drawing Sheets

(56) References Cited

U.S. PATENT DOCUMENTS

| | | | | |
|---|---|---|---|---|
| 2013/0218624 | A1* | 8/2013 | Ikeda | G06Q 10/06 |
| | | | | 705/7.22 |
| 2013/0247059 | A1 | 9/2013 | Amsterdam et al. | |
| 2013/0297084 | A1* | 11/2013 | Kubota | H01M 10/465 |
| | | | | 700/286 |
| 2018/0031533 | A1* | 2/2018 | Rawat | G06Q 50/06 |
| 2022/0253869 | A1* | 8/2022 | Oates | G06Q 50/06 |
| 2023/0245009 | A1* | 8/2023 | Roy | G06F 1/3206 |
| | | | | 705/7.12 |

FOREIGN PATENT DOCUMENTS

| | | | | |
|---|---|---|---|---|
| CN | 106251095 | A | | 12/2016 |
| CN | 109272243 | A * | 1/2019 | ......... G06Q 10/0637 |
| CN | 111277006 | A | | 6/2020 |
| CN | 113744079 | A * | 12/2021 | ......... G06Q 10/0639 |
| CN | 114548562 | A | | 5/2022 |
| EP | 3291165 | A1 | | 3/2018 |
| JP | 2005107944 | A * | 4/2005 | |

OTHER PUBLICATIONS

Inch Calculator; "Watts to Kilowatts Conversion"; Accessed as of Nov. 25, 2020; pp. 1-7 (Year: 2020).*
English translation of CN-113744079-A (Year: 2021).*
English translation of JP-2005107944-A (Year: 2005).*
English translation of CN-109272243-A (Year: 2019).*
International Search Report dated Mar. 20, 2023 in International Application No. PCT/CN2023/071312. English translation attached.
Yuan Shulin et al., "A Research on the Allocation Model of Carbon Emission in Power System Based on Carbon Emission Flow Theory", Modern Electric Power, vol. 31, No. 6, Dec. 10, 2014, Full text.
Chen Houhe et al., "Low-carbon optimal scheduling of a power system source-load considering coordination based on carbon emission flow theory", Power System Protection and Control, vol. 49, No. 10, May 16, 2021, p. 2, Part 1.1, p. 3, Parts 1.2-1.3.
Luo Yifan et al., "Study on Carbon Emission Intensity Rating of Power Consumer Side and Green Power Certificates Distribution", Water Resources and Power, vol. 33, No. 10, Oct. 25, 2015, p. 200, Part 3.
First Office Action dated Jun. 14, 2025 received in corresponding patent family application No. CN202210171987.8. English translation attached.

* cited by examiner

METHOD AND APPARATUS FOR CALCULATING CARBON EMISSION RESPONSE BASED ON CARBON EMISSION FLOWS

CROSS-REFERENCE TO RELATED APPLICATION

The present application is a continuation of International Application No. PCT/CN2023/071312 filed on Jan. 9, 2023, which claims priority to Chinese Patent Application No. 202210171987.8, filed on Feb. 24, 2022, the entire disclosure of which is incorporated herein by reference.

FIELD

The present disclosure relates to the field of low carbon technologies, and more particularly, to a method and apparatus for calculating carbon emission response based on carbon emission flows.

BACKGROUND

The demand response is a critical technology in smart grid technologies. With the continuous increasing demand for electricity from residents, a peak load is easily generated at the time of peak electricity consumption. Therefore, there is a mismatch between the power supply and the power demand of the power grid, and great challenges are brought to the security of the power system operation. The demand response technology can avoid the peak load by guiding the energy usage behavior of users with carbon meters. Moreover, the peak load of the electricity consumption is reduced and the security of the power system operation is ensured.

In the context of climate change and sustainable development, low-carbon operation on an energy demand side is an important emission reduction approach. The related technology is mainly to adjust power consumption of the demand side based on both the power and energy balance of the power system. However, since the actual carbon emission intensity on a demand side user cannot be obtained, it lacks effective guidance and adjustment for carbon emission. Therefore, the carbon emission regulation capability of the demand response technology is low and needs to be improved urgently.

SUMMARY

The present disclosure is provided based on cognition and discovery of the following problems.

Analysis and calculation of carbon emission are basic and critical work for realizing a carbon emission response on the demand side, and a carbon emission flow technology is an indirect carbon emission calculation method on an energy usage side based on the network flow analysis idea. The carbon emission flow technology uses a power flow tracing method for carbon flow tracing to reveal the basic characteristic and rules of virtual carbon emission flows in an energy network, and a carbon emission flow calculation method is proposed in the related art by establishing a carbon emission flow model combined with the network structure and the physical characteristic of a power grid. The technology is a carbon emission flow technology for a power system, which defines a physical meaning, a calculation method, and a conversion relation of indices such as the carbon emission intensity and density at a node or a branch in the power system.

In summary, in the field of low-carbon technologies, the related art needs to be improved on a basis of the existing demand response technology. There is a need to provide a method, process and system for calculating carbon emission response based on carbon emission flows. On the basis of the existing demand response technology and in combination with the carbon emission flow technology, the carbon emission response technology is provided to calculate a carbon dioxide emission reduction subsequent to a demand response, and a set of response processes and systems in the carbon emission response is provided.

A first aspect of the present disclosure provides a method for calculating carbon emission response based on carbon emission flows. The method includes: calculating a total carbon flow rate of a power system from a carbon flow rate of each of carbon meter users, the carbon flow rate being obtained based on a carbon emission flow of the carbon meter user; determining whether the total carbon flow rate is greater than a carbon emission response threshold; and calculating, in response to determining that the total carbon flow rate is greater than the carbon emission response threshold, a target carbon emission reduction of one or more of the carbon meter users during a carbon emission response period based on target carbon emission response demand, and initiating a carbon emission response based on the target carbon emission reduction.

Optionally, in an embodiment of the present disclosure, said calculating the total carbon flow rate from the carbon flow rate of each of the carbon meter users includes: calculating the carbon emission flow of each of the carbon meter users based on a power flow, various power outputs, and a load of the carbon meter user of the power system; obtaining a carbon emission intensity at a corresponding node of each of the carbon meter users in the power system based on the carbon emission flow of the carbon meter user, and determining a nodal carbon potential of the carbon meter user during a current period; and calculating, based on the nodal carbon potential of the carbon meter user, the carbon flow rate of the carbon meter user to obtain the total carbon flow rate.

Optionally, in an embodiment of the present disclosure, a calculation equation of the carbon flow rate of each of the carbon meter users is: $R_i = e_i P_i$, $\forall i = 1, \ldots, N$, where i represents a node, $e_i$ represents a carbon potential of an i-th (i=1, 2, ..., N) system node, N represents a total number of the carbon meter users, $R_i$ represents a carbon flow rate of a carbon meter user i in unit of $kgCO_2/h$ that is defined as a carbon emission consumed by the carbon meter user due to energy usage at unit time, and $P_i$ represents an electric power of the carbon meter user i in unit of kW.

Optionally, in an embodiment of the present disclosure, a calculation equation of the target carbon emission reduction is: $\Delta F_i = R_i - \int_{t=T}^{T+1} R_{i,t} dt$, where $\Delta F_i$ represents a reduced carbon emission of the carbon meter user i during the carbon emission response period in unit of $kgCO_2$, $R_{i,t}$ represents a real-time carbon flow rate of the carbon meter user, and T represents a current moment.

Optionally, in an embodiment of the present disclosure, the method further includes, before said determining whether the total carbon flow rate is greater than the carbon emission response threshold: determining, based on a total installed capacity and an average carbon emission intensity of a thermal power unit of the power system, the carbon emission response threshold.

A second aspect of the present disclosure provides an apparatus for calculating carbon emission response based on carbon emission flows. The apparatus includes: a calculation module configured to calculate a total carbon flow rate of a power system from a carbon flow rate of each of carbon meter users, the carbon flow rate being obtained based on a carbon emission flow of the carbon meter user; a determining module configured to determine whether the total carbon flow rate is greater than a carbon emission response threshold; and a response module configured to calculate, in response to determining that the total carbon flow rate is greater than the carbon emission response threshold, a taruet carbon emission reduction of one or more of the carbon meter users during a carbon emission response period based on target carbon emission response demand, and initiate a carbon emission response based on the target carbon emission reduction.

Optionally, in an embodiment of the present disclosure, the calculation module includes: a first calculation unit configured to calculate the carbon emission flow of each of the carbon meter users based on a power flow, various power outputs, and a load of the carbon meter user of the power system; an obtaining unit configured to obtain a carbon emission intensity at a corresponding node of each of the carbon meter users in the power system based on the carbon emission flow of the carbon meter user, and determine a nodal carbon potential of the carbon meter user during a current period; and a second calculation unit configured to calculate, based on the nodal carbon potential of the carbon meter user, the carbon flow rate of the carbon meter user to obtain the total carbon flow rate.

Optionally, in an embodiment of the present disclosure, a calculation equation of the carbon flow rate of each of the carbon meter users is: $R_i = e_i P_i$, $\forall i=1, \ldots, N$, where i represents a node, $e_i$ represents a carbon potential of an i-th (i=1, 2, ..., N) system node, N represents a total number of the carbon meter users, $R_i$ represents a carbon flow rate of a carbon meter user i in unit of $kgCO_2/h$ that is defined as a carbon emission consumed by the carbon meter user due to energy usage at unit time, and $P_i$ represents an electric power of the carbon meter user i in unit of kW.

Optionally, in an embodiment of the present disclosure, a calculation equation of the target carbon emission reduction is: $\Delta F_i = R_i - \int_{t=T}^{T+1} R_{i,t} dt$, where $\Delta F_i$ represents a reduced carbon emission of the carbon meter user z during the carbon emission response period in unit of $kgCO_2$, $R_{i,t}$ represents a real-time carbon flow rate of the carbon meter user, and T represents a current moment.

Optionally, in an embodiment of the present disclosure, the apparatus for calculating carbon emission response based on the carbon emission flows further includes a threshold determining module that is configured to determine, based on a total installed capacity and an average carbon emission intensity of a thermal power unit of the power system, the carbon emission response threshold.

A third aspect of the present disclosure provides an electronic device. The electronic device includes a memory, a processor, and a computer program stored on the memory and executable on the processor. The processor is configured to execute the program to implement the method for calculating carbon emission response based on the carbon emission flows according to the above embodiments.

A fourth aspect of the present disclosure provides a computer readable storage medium having a computer program stored thereon. The program is configured to be executed by a processor to implement the method for calculating carbon emission response based on the carbon emission flows described above.

The embodiments of the present disclosure calculate a total carbon flow rate of a power system, and initiate carbon emission response based on the total carbon flow rate of the power system and in combination with target carbon emission response demand, such that indirect emission on energy usage of the carbon meter user can be easily obtained in real time. Furthermore, the carbon emission reduction subsequent to the carbon meter user response is calculated so that the carbon meter user is effectively guided to reduce the user's demand during a period of a high carbon emission intensity. Moreover, a reasonable implementation scheme is provided for a whole process of the carbon emission response, and thus an overall carbon emission level of the power system is effectively reduced. Therefore, it can solve the problems that since the actual carbon emission intensity on the demand side user cannot be obtained in the related art, the carbon emission cannot be effectively adjusted by the power system, such that the demand response technology has low carbon emission regulation capability, and the low-carbon emission demand cannot be met.

Additional aspects and advantages of the embodiments of present disclosure will be provided at least in part in the following description, or will become apparent in part from the following description, or can be learned from the practice of the embodiments of the present disclosure.

BRIEF DESCRIPTION OF THE DRAWINGS

These and other aspects and advantages of embodiments of the present disclosure will become apparent and more readily appreciated from the following descriptions with reference to the accompanying drawings.

DETAILED DESCRIPTION

The embodiments of the present disclosure will be described in detail below with reference to examples thereof as illustrated in the accompanying drawings, throughout which same or similar units, or units having same or similar functions, are denoted by same or similar reference signs. The embodiments described below with reference to the drawings are illustrative, and are intended to explain rather than limit the present disclosure.

An apparatus for calculating carbon emission response based on carbon emission flows according to embodiments of the present disclosure are described below with reference to the accompanying drawings. As stated in the background, since the actual carbon emission intensity on the demand side user cannot be obtained in the related art, the demand-side carbon emission cannot be effectively guided by the power system, such that the demand response technology has low carbon emission regulation capability, and the low-carbon emission demand cannot be met. The present disclosure provides a method for calculating carbon emission response based on carbon emission flows. This method calculates a total carbon flow rate of a power system, and initiates carbon emission response based on the total carbon flow rate of the power system and in combination with target carbon emission response demand, such that indirect emission on energy usage of the carbon meter user can be easily obtained in real time. Furthermore, the carbon emission reduction subsequent to the carbon meter user response is calculated so that the carbon meter user is effectively guided to reduce the user's demand during a period of a high carbon emission intensity. Moreover, a reasonable implementation scheme is provided for a whole process of the carbon emission response, and thus an overall carbon emission level of the power system is effectively reduced. Therefore, it can solve the problems that since the actual carbon emission intensity on the demand side user cannot be obtained in the related art, the carbon emission cannot be effectively adjusted by the power system, such that the demand response technology has low carbon emission regulation capability, and the low-carbon emission demand cannot be met.

Figure 1:
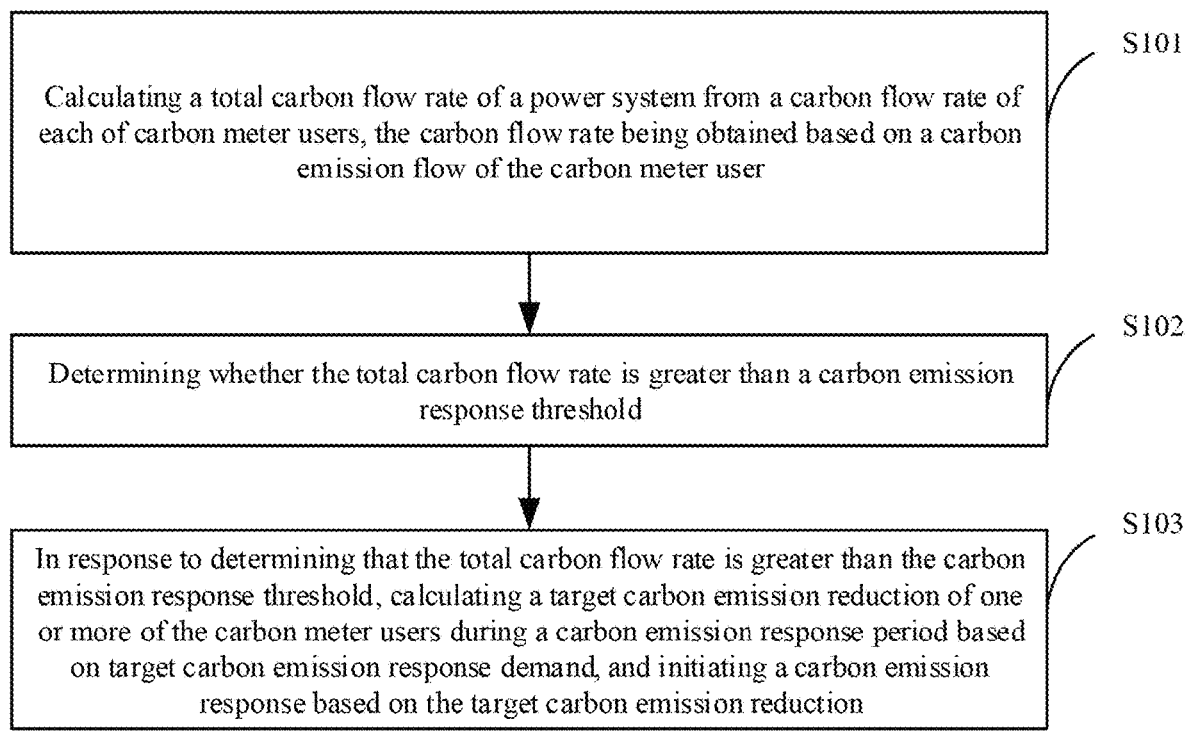
FIG. 1 is a flowchart of a method for calculating carbon emission response based on carbon emission flows according to an embodiment of the present disclosure.

Specifically, FIG. 1 is a schematic diagram of a flowchart of a method for calculating carbon emission response based on carbon emission flows according to embodiments of the present disclosure.

As illustrated in FIG. 1, the method for calculating carbon emission response based on carbon emission flows includes operations at the following blocks.

At block S101, a total carbon flow rate of a power system is calculated from a carbon flow rate of each of carbon meter users. The carbon flow rate of each of the carbon meter users is obtained based on a carbon emission flow of the carbon meter user.

It should be understood that, in the embodiments of the present disclosure, a carbon meter user refers to a single electricity consumption load node that has been contracted in a specific region, or a load integrator integrated with an integrated electricity consumption of carbon meter users in a certain region, both of which are equipped with a carbon meter and energy management unit. According to the embodiments of the present disclosure, the carbon flow rate of each of the carbon meter users is obtained based on the carbon emission flow of the carbon meter user, and the total carbon flow rate of the power system is calculated based on the carbon flow rate. According to the embodiments of the present disclosure, the total carbon flow rate of the power system is calculated so that the actual carbon emission intensity on the demand side of the carbon meter users can be obtained, and thus it is advantageous for the power system to effectively adjust the carbon emission. In this way, the carbon emission regulation capability of the demand response technology is improved, and the low-carbon emission demand is met.

Optionally, in an embodiment of the present disclosure, the operation of calculating the total carbon flow rate from the carbon flow rate of each of the carbon meter users includes calculating, based on a power flow, various power outputs and a carbon meter user load of the power system, the carbon emission flow of each of the carbon meter users; obtaining a carbon emission intensity at a corresponding node of each of the carbon meter users in the power system based on the carbon emission flow of the carbon meter user, and determining a nodal carbon potential of each of the carbon meter users in a current period; and calculating, based on the nodal carbon potential of each of the carbon meter users, the carbon flow rate of the carbon meter user to obtain the total carbon flow rate.

In an embodiment of the present disclosure, the carbon emission intensity at the corresponding node of each of the carbon meter users in the power system can be obtained through a central server based on the power flow, various power outputs, and the carbon meter user load of the power system, and based on the carbon emission flow of the carbon meter user. The nodal carbon potential of each of the carbon meter users in the current period is determined in accordance with the carbon emission intensity. In addition, the carbon flow rate of each of the carbon meter users is calculated based on the nodal carbon potential of the carbon meter user, and the total carbon flow rate is obtained through the carbon emission flow calculation. The central server is a control server managed by a power grid dispatching center responsible for initiating a carbon emission response instruction. According to the embodiments of the present disclosure, the total carbon flow rate of the power system is calculated so that the actual carbon emission intensity on the demand side of the carbon meter users can be obtained, and thus it is advantageous for the power system to effectively adjust the carbon emission. In this way, the carbon emission regulation capability of the demand response technology is improved, and the low-carbon emission demand is met.

In an actual performing process, a calculation method for a carbon emission flow is as follows.

A branch power flow distribution matrix is defined. In an embodiment of the present disclosure, the branch power flow distribution matrix of the system may be represented by $$P_B = (P_{B_{ij}})_{N \times N}.$$

When a branch is connected between a node i and a node/(i, j=1, 2, ..., N), and a forward active power flow that flows to the node i through the branch is p, $P_{B_{ij}}=p$ and $P_{B_{ji}}=0$. When the active power flow p flowing through the branch is a reverse power flow, $P_{B_{ij}}=0$ and $P_{B_{ji}}=p$. In other cases, $P_{B_{ij}}=P_{B_{ji}}=0$.

It should be noted that for all diagonal units, there is $P_{B_{ii}}=0$ (i=1, 2, ..., N).

A power injection distribution matrix is defined. In an embodiment of the present disclosure, the power injection distribution matrix of the system may be represented by $$P_G = (P_{G_{kj}})_{K \times N}.$$

When a k-th (k=1, 2, ... K) generator unit is connected to the node j, and an active power flow of the generator unit injected to the node j is p, $P_{G_{kj}}=p$, otherwise $P_{G_{jk}}=0$.

A nodal active power flux matrix is defined. In an embodiment of the present disclosure, the nodal active power flux matrix of the system may be represented by $$P_N = (P_{N_{ij}})_{N \times N}.$$

The nodal active power flux is defined to represent an absolute value of the active power flow injected at a node in a power flow direction. In the carbon emission flow calculation, this concept is utilized to describe contribution of the generator unit to the node and contribution of the node to the nodal carbon potential in the system. The node i satisfies:

$$P_{N_{ii}} = \Sigma_{=s \in I^+} p_{B_s} + p_{G_i},$$

where $I^+$ represents a branch set including a power flow inflow node i, $p_{B_s}$ represents an active power of a branch s, $p_{G_i}$ represents an active power output of the unit injected to the node i. When the node has no generator unit or the power output of the unit is 0, $p_{G_i}=0$. All non-diagonal units of the matrix satisfies $P_{N_{ij}}=0 (i \neq j)$.

A unit carbon emission intensity vector is defined. In an embodiment of the present disclosure, the carbon emission intensity of the unit can be defined as a carbon emission value resulting from electric energy per unit generated by the generator unit, which is expressed at $kgCO_2/kWh$.

A carbon emission intensity of a k-th (k=1, 2, ..., K) generator unit is recorded as $e_{Gk}$, and the carbon emission intensity vector of the unit is expressed as:

$$E_G = [e_{G1}, e_{G2}, \ldots, e_{GK}]^T.$$

A nodal carbon potential vector is defined. In an embodiment of the present disclosure, the nodal carbon potential may be defined as a value equivalent to a carbon emission value on a power generation side resulting from the consumption of unit electric energy at this node, and the nodal carbon potential is expressed at $kgCO_2/kWh$.

A carbon potential of an i-th (i=1, 2, ..., N) system node is recorded as $e_i$, and the nodal carbon potential vector is expressed as:

$$E_N = [e_1, e_2, \ldots, e_N]^T.$$

A nodal carbon potential is calculated as follows. In an embodiment of the present disclosure, the carbon potential $e_i$ of the node i in the system is calculated from the following equation:

$$e_i = \frac{\eta_N^{(i)} \cdot (P_B^T \cdot E_N + P_G^T \cdot E_G)}{\sum_{j=1}^N P_{B_{ji}} + \sum_{k=1}^K P_{G_{ki}}},$$

where $\eta_N^{(i)} = (0, 0, \ldots, 1, \ldots 0)$ represents an N-dimensional unit row vector, and an i-th element thereof is 1.

A carbon potential vector for full system nodes is calculated, which includes the following:

a nodal active power flux matrix is defined as:

$$\Sigma_{j=1}^N P_{B_{ji}} + \Sigma_{k=1}^k P_{G_{ki}} = \eta hd \ N^{(i)} \cdot P_N \cdot (\eta_N^{(i)})^T,$$

a combination of the nodal carbon potential and the nodal active power flux matrix obtains:

$$\eta_N^{(i)} \cdot P_N \cdot (\eta_N^{(i)})^T \cdot e_i = \eta_N^{(i)} \cdot (P_B^T \cdot E_N + P_G^T \cdot E_G),$$

the above equation for the nodal carbon potential is expanded to a full system dimension:

$$P_N \cdot E_N = P_B^T \cdot E_N + P_G^T \cdot E_G, \text{ and}$$

the $E_N$ is transposed and merged to obtain a calculation equation of the carbon potential vector of the full system nodes:

$$E_N = (P_N - P_B^T)^{-1} \cdot P_G^T \cdot E_G.$$

Optionally, in an embodiment of the present disclosure, a calculation equation of the carbon flow rate of each of the carbon meter users is:

$$R_i = e_i P_i, \forall i = i = 1, \ldots, N,$$

where i represents a node, $e_i$ represents a carbon potential of an i-th (i=1, 2, ..., N) system node, N represents a total number of the carbon meter users, $R_i$ represents a carbon flow rate of a carbon meter user i that is defined as a carbon emission consumed by the carbon meter user due to energy usage at unit time and is expressed at $kgCO_2/h$, and $P_i$ represents an electric power of the carbon meter user i that is expressed at kW.

In some specific embodiments, data of the nodal carbon potential at a corresponding node where each carbon meter on the user side is located is received by the carbon meter, and the carbon flow rate of each of the carbon meter users is obtained through the calculation equation of the carbon flow rate of the carbon meter user. The carbon flow rate $R_i$ of the carbon meter user is uploaded to the central server.

The central server can store nodal carbon flow data of each of the carbon meter users to calculate the total carbon flow rate of the carbon meter users in the region, and a specific calculation method thereof is as follows.

The total carbon flow rate is obtained by adding the carbon flow rates uploaded respectively by the carbon meter users as below:

$$R_{total} = \Sigma_{i=1}^N R_i.$$

where $R_{total}$ refers to the total carbon flow rate of the carbon meter users in the region.

At block S102, a determination is made as to whether the total carbon flow rate is greater than a carbon emission response threshold.

In the actual performing process, in an embodiment of the present disclosure, the total carbon flow rate $R_{total}$ obtained through the calculation can be compared with the carbon emission response threshold $R_{thres}$. Specifically, when $R_{total} > R_{thres}$, the method proceeds to block S103, otherwise, it retunes to block S101 and calculates the total carbon flow rate $R_{total}$ within an update period. According to the embodiment of the present disclosure, the total carbon flow rate is compared with the carbon emission response threshold to further determine a response solution, and thus it is advantageous for the power system to effectively adjust the carbon emission. In this way, the regulation capability of the carbon emission of the demand response technology is improved, and the low-carbon emission demand is met.

The carbon emission response threshold will be described in detail below.

Optionally, in an embodiment of the present disclosure, the method further includes, prior to the operation of determining whether the total carbon flow rate is greater than the carbon emission response threshold, determining the carbon emission response threshold based on a total installed capacity of a thermal power unit of the power system and an average carbon emission intensity of the thermal power unit of the power system.

The carbon emission response threshold is described in detail. In an embodiment, the carbon emission response threshold may be determined by a power installation structure in the region. According to the embodiment of the present disclosure, the carbon emission response threshold is determined based on the total installed capacity of the thermal power unit of the power system and the average carbon emission intensity of the thermal power unit. For example, according to an embodiment of the present disclosure, the carbon emission response threshold may be set as a value calculated by multiplying the total installed capacity of the thermal power unit by 80% of the average carbon emission intensity of the thermal power unit, and a specific value of the carbon emission response threshold may be set by those skilled in the art based on an actual situation, which is not specifically limited herein.

At block S103, as determining that the total carbon flow rate is greater than the carbon emission response threshold, a target carbon emission reduction of one or more of the carbon meter users are calculated during a carbon emission response period based on target carbon emission response demand, and a carbon emission response is initiated based on the target carbon emission reduction.

According to an embodiment of the present disclosure, the response demand can be issued based on a degree to which a current total carbon flow rate exceeds a carbon emission response threshold, and the demand information is transmitted to the energy management unit on the carbon meter user side. The carbon response demand includes the response period and carbon emission reduction demand Specifically, the response demand is to reduce the energy usage on the carbon meter user side and achieve the carbon response by calculating the target carbon emission reduction of the one or more of the carbon meter users during the carbon emission response period, and issuing response demand to one or more of the carbon meter users based on the target carbon emission reduction. Specifically, the carbon response demand information is received by the carbon table user side, and an electricity consumption load of the carbon meter user is reduced during the response period to reduce the nodal carbon flow rate of the carbon meter user. According to the embodiment of the present disclosure, the target carbon emission reduction is calculated, and the corresponding response demand is issued to the carbon meter user. In this way, the carbon emission amount of the power system is effectively adjusted, the regulation capability of the carbon emission of the demand response technology is improved, and the low-carbon emission demand is met.

Optionally, in an embodiment of the present disclosure, a calculation equation of the target carbon emission reduction is:

$$\Delta F_i = R_i - \int_{t=T}^{T+1} R_{i,t} dt,$$

where $\Delta F_i$ represents a reduced carbon emission of the carbon meter user i during the carbon emission response period in unit of $kgCO_2$, $R_{i,t}$ represents a real-time carbon flow rate of the carbon meter user, and T represents a current moment.

Specifically, in an embodiment of the present disclosure, the current moment may be recorded as I and the response period is a period from a T period to a T+1h moment.

In an embodiment of the present disclosure, the carbon emission reduction demand is allocated based on a load ratio of each of the carbon meters, and may be defined as:

$$\tilde{R}_i = k \frac{P_i}{\sum_{i=1}^{N} P_i} (R_{total} - R_{thres}),$$

where N represent a total number of carbon meter users, k represents a distribution multiple that is generally set to be greater than 1, and k=1.2 is selected herein.

In an embodiment of the present disclosure, a real-time carbon flow rate $R_{i,t}$ of the carbon meter user can be obtained by the carbon meter, and the real-time carbon emission reduction intensity of the carbon meter user is calculated as:

$$\Delta R_{i,t} = R_i - R_{i,t},$$

where $R_i$ represents the carbon flow rate uploaded by the carbon meter user i at the action of the above block.

According to an embodiment of the present disclosure, $\Delta R_{i,t}$ and the carbon emission reduction demand $\tilde{R}_t$ can be compared, and when $\Delta R_{i,t} < \tilde{R}_t$, the result is fed back to the energy management unit, requiring to increase a load reduction degree. Otherwise, the energy management unit keeps the current reduction unchanged, or the load of the carbon meter user is properly increased to realize a real-time dynamic carbon emission response of the carbon meter user.

The carbon emission reduction of each of the carbon meter users during the carbon emission response period is as follows:

$$\Delta F_i = R_i - \int_{t=T}^{T+1} R_{i,t} dt,$$

where $\Delta F_i$ represents a reduced carbon emission of the carbon meter user i during the carbon emission response period in unit of $kgCO_2$.

It can be understood that a subsequent emission reduction of the carbon meter user can be used as the basis for subsequent emission reduction compensation for a response behavior of the carbon meter user, thereby ensuring benefit of the carbon meter user. An embodiment of the present disclosure is described in detail below with reference to FIG. 2 and FIG. 3.

Figure 2:
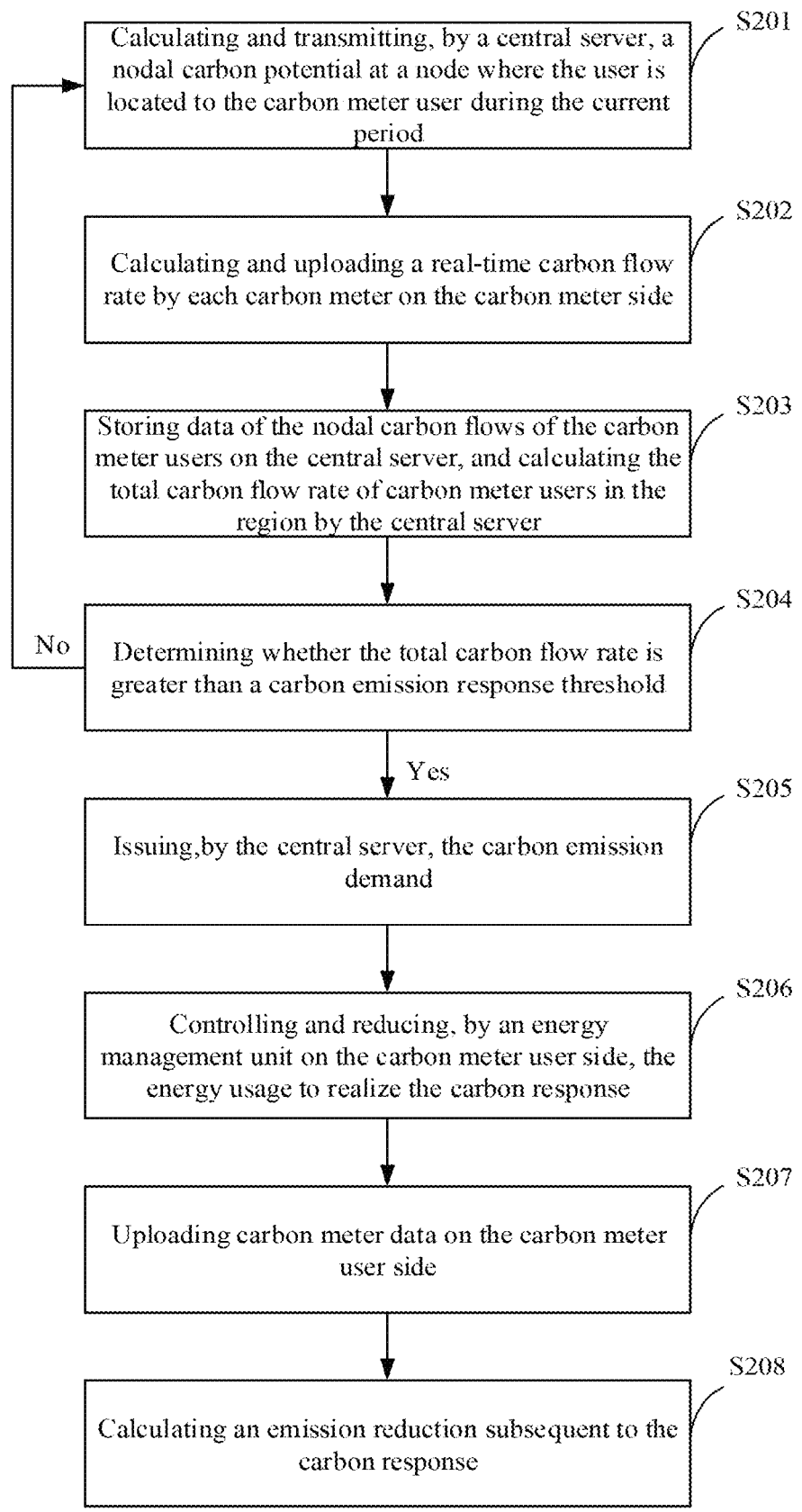
FIG. 2 is a flowchart of a method for calculating carbon emission response based on carbon emission flows according to a specific embodiment of the present disclosure.
Figure 3:
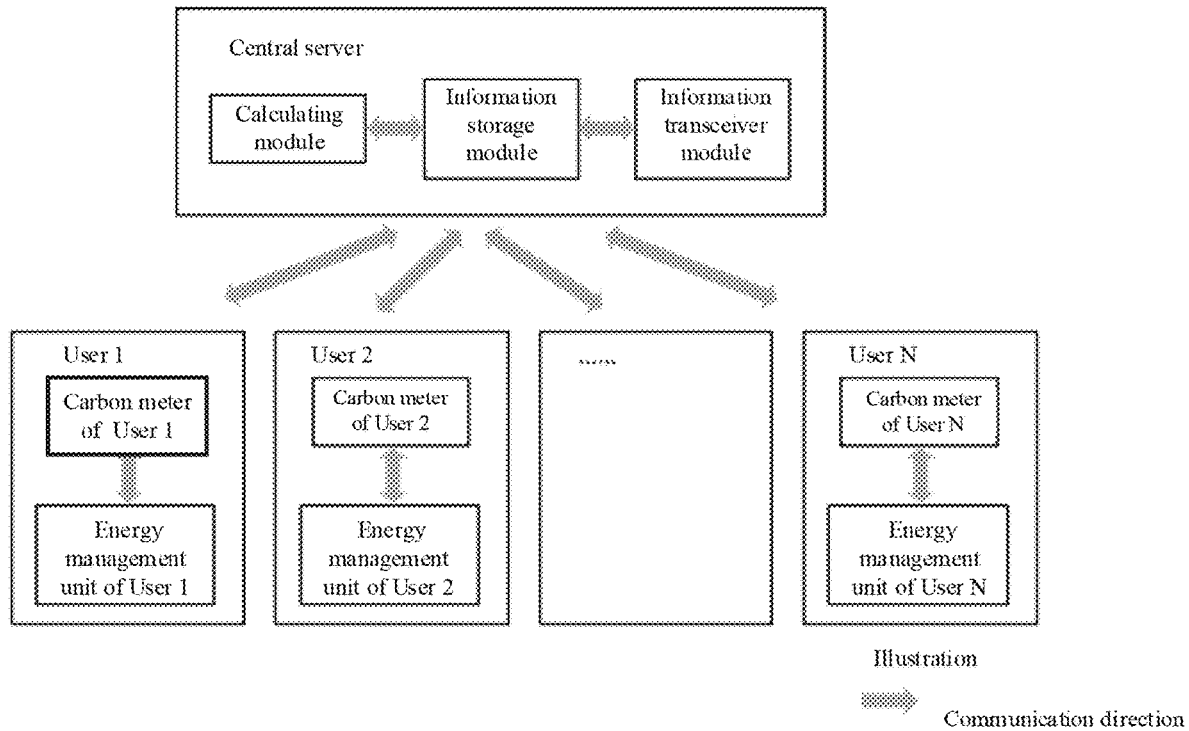
FIG. 3 is a schematic diagram of a method for calculating carbon emission response based on carbon emission flows according to a specific embodiment of the present disclosure.

As illustrated in FIG. 2, at block S201, the central server calculates and transmits a carbon potential at a node where the user is located during the current period to the carbon meter user. In the embodiment of the present disclosure, the carbon meter user refers to a single electricity consumption load node that has been contracted in a specific region, or a load integrator integrated with an integrated electricity consumption of carbon meter users in a certain region, both of which are equipped with a carbon meter and energy management unit. The central server refers to a control server managed by a power grid dispatching center responsible for initiating a carbon emission response instruction.

In the embodiment of the present disclosure, the power grid dispatching center can obtain the carbon emission intensity of each current node through the calculation of the carbon emission flow based on the data such as the power flow of the system, various power outputs, and loads of the carbon meter users. For each of the carbon meter users participating in the carbon emission response, the central server can obtain a position of the node where the carbon meter user is located, and then send the data of the nodal carbon potential at this node to the carbon meter user. According to the embodiment of the present disclosure, the total carbon flow rate of the power system is calculated so that the actual carbon emission intensity on the demand side user can be obtained, and thus it is advantageous for the power system to effectively adjust the carbon emission. In this way, the carbon emission regulation capability of the demand response technology is improved, and the low-carbon emission demand is met.

A calculation method for a carbon emission flow is as follows.

A branch power flow distribution matrix is defined. In an embodiment of the present disclosure, the branch power flow distribution matrix of the system may be represented by $$P_B = (P_{B_{ij}})_{N \times N}.$$

When a branch is connected between a node i and a node j (i,j=1, 2, . . . , N), and a forward active power flow that flows to the node i through the branch is p, $P_{B_{ij}} = p$ and $P_{B_{ji}} = 0$.

When the active power flow p flowing through the branch is a reverse power flow, $P_{B_{ij}}=0$ and $P_{B_{ji}}=p$. In other cases, $P_{B_{ij}}=P_{B_{ji}}=0$.

It should be noted that for all diagonal units, there is $P_{B_{ii}}=0$ (i=1, 2, ..., N).

A power injection distribution matrix is defined. In an embodiment of the present disclosure, the power injection distribution matrix of the system may be represented by $$P_G = (P_{G_{kj}})_{K \times N}.$$

When a k-th (k=1, 2, ..., K) generator unit is connected to the node j, and an active power flow of the generator unit injected to the node j is p, $P_{G_{kj}}=p$, otherwise $P_{G_{kj}}=0$.

A nodal active power flux matrix is defined. In an embodiment of the present disclosure, the nodal active power flux matrix of the system may be represented by $$P_N = (P_{N_{ij}})_{N \times N}.$$

The nodal active power flux is defined to represent an absolute value of the active power flow injected at a node in a power flow direction. In the carbon emission flow calculation, this concept is utilized to describe contribution of the generator unit to the node and contribution of the node to the nodal carbon potential in the system. The node i satisfies:

$$P_{N_{ii}} = \Sigma_{s \in I^+} p_{B_s} + p_{G_i},$$

where $I^+$ represents a branch set including a power flow inflow node i, $p_{B_s}$ represents an active power of a branch s, $p_{G_i}$ represents an active power output of the unit injected to the node i. When the node has no generator unit or the power output of the unit is 0, $p_{G_i}=0$. All non-diagonal units of the matrix satisfies $P_{N_{ij}}=0 (i \neq j)$.

A carbon emission intensity vector of the unit is defined. In an embodiment of the present disclosure, the carbon emission intensity of the unit can be defined as a carbon emission value resulting from electric energy per unit generated by the generator unit, which is expressed at $kgCO_2/kWh$.

A carbon emission intensity of a k-th (k=1, 2, ..., K) generator unit is recorded as $e_{Gk}$, and the carbon emission intensity vector of the unit is expressed as:

$$E_G = [e_{G1}, e_{G2}, \ldots, e_{GK}]^T.$$

A nodal carbon potential vector is defined. In an embodiment of the present disclosure, the nodal carbon potential may be defined as a value equivalent to a carbon emission value on a power generation side resulting from the consumption of unit electric energy at this node, and the nodal carbon potential is expressed at $kgCO_2/kWh$.

A carbon potential of an i-th (i=1, 2, ..., N) system node is recorded as $e_i$, and the nodal carbon potential vector is expressed as:

$$E_N = [e_1, e_2, \ldots, e_N]^T.$$

A nodal carbon potential is calculated as follows. In an embodiment of the present disclosure, the carbon potential $e_i$ of the node i in the system is calculated from the following equation:

$$e_i = \frac{\eta_N^{(i)} \cdot (P_B^T \cdot E_N + P_G^T \cdot E_G)}{\sum_{j=1}^N P_{B_{ji}} + \sum_{k=1}^K P_{G_{ki}}},$$

where $\eta_N^{(i)} = (0, 0, \ldots, 1, \ldots 0)$ represents an N-dimensional unit row vector, and an i-th element thereof is 1.

A carbon potential vector for full system nodes is calculated, which includes the following:

a nodal active power flux matrix is defined as:

$$\Sigma_{j=1}^N P_{B_{ji}} + \Sigma_{k=1}^K P_{G_{ki}} = \eta hd N^{(i)} \cdot P_N \cdot (\eta_N^{(i)})^T,$$

a combination of the nodal carbon potential and the nodal active power flux matrix obtains:

$$\eta_N^{(i)} \cdot P_N \cdot (\eta_N^{(i)})^T \cdot e_i = \eta_N^{(i)} \cdot (P_B^T \cdot E_N + P_G^T \cdot E_G),$$

the above equation for the nodal carbon potential is expanded to a full system dimension:

$$P_N \cdot E_N = P_B^T \cdot E_N = P_G^T \cdot E_G, \text{ and}$$

the $E_N$ is transposed and merged to obtain a calculation equation of the carbon potential vector of the full system nodes:

$$E_N = (P_N - P_B^T)^{-1} \cdot P_G^T \cdot E_G.$$

At block S202, a real-time carbon flow rate is calculated and uploaded by a carbon meter of each carbon meter user side.

In an embodiment, a calculation equation of the carbon flow rate of the carbon meter user is:

$$R_i = e_i P_i, \forall i=1, \ldots, N,$$

where i represents a node, $e_i$ represents a carbon potential of an i-th (i=1, 2, ..., N) system node, N represents a total number of the carbon meter users, $R_i$ represents a carbon flow rate of a carbon meter user i that is defined as a carbon emission consumed by the carbon meter user due to energy usage at unit time and is expressed at $kgCO_2/h$, and $P_i$ represents an electric power of the carbon meter user i that is expressed at kW.

At block S203, the central server stores nodal carbon flow data of each of the carbon meter users to calculate the total carbon flow rate of the carbon meter users in the region.

In an embodiment, the total carbon flow rate is obtained by adding the carbon flow rates uploaded respectively by the carbon meter users as below:

$$R_{total} = \Sigma_{i=1}^N R_i,$$

where $R_{total}$ refers to the total carbon flow rate of the carbon meter users in the region.

At block S204, a determination is made as to whether the total carbon flow rate is greater than a carbon emission response threshold. The determination is made as to whether the total carbon flow rate $R_{total}$ is greater than a preset carbon emission response threshold $R_{thres}$. When $R_{total} > R_{thres}$, the method proceeds to a next step, otherwise, it retunes to block S201. The emission response threshold should be determined by a power installation structure in the region, for example, may be set as a value calculated by multiplying the total installed capacity of the thermal power unit by 80% of the average carbon emission intensity of the thermal power unit. According to the embodiment of the present disclosure, the total carbon flow rate is compared with the carbon emission response threshold to further determine a response solution, and thus it is advantageous for the power system to effectively adjust the carbon emission. In this way, the regulation capability of the carbon emission of the demand response technology is improved, and the low-carbon emission demand is met.

At block S205, the carbon emission demand is issued by the central server. According to an embodiment of the present disclosure, the response demand can be issued based on a degree to which a current total carbon flow rate exceeds a preset carbon emission response threshold, and the demand information is transmitted to the energy management unit on the user side. The carbon response demand includes the response period and carbon emission reduction demand.

In an embodiment of the present disclosure, the current moment may be recorded as T, and the response period is a period from a T period to a T+1 h moment. In the embodiment of the present disclosure, the carbon emission reduction demand is allocated based on a load ratio of each of the carbon meters, and may be defined as:

$$\tilde{R}_t = k \frac{P_i}{\sum_{i=1}^{N} P_i} (R_{total} - R_{thres}),$$

where N represent a total number of carbon meter users, k represents a distribution multiple that is generally set to be greater than 1, and k=1.2 is selected herein.

At block S206, the energy usage reduction is controlled by the energy management unit on the carbon meter user side to realize the carbon response. The energy management unit on the carbon meter user side is configured to receive carbon response demand information, and reduce the nodal carbon flow rate of the user by reducing the electricity consumption load of the user during the response period.

In an embodiment of the present disclosure, a real-time carbon flow rate $R_{i,t}$ of the carbon meter user can be obtained by the carbon meter, and the real-time carbon emission reduction intensity of the carbon meter user is calculated as:

$$\Delta R_{i,t} = R_i - R_{i,t},$$

where $R_i$ represents the carbon flow rate uploaded by the carbon meter user i at block S202.

According to an embodiment of the present disclosure, $\Delta R_{i,t}$ and the carbon emission reduction demand $\tilde{R}_t$ can be compared, and when $\Delta R_{i,t} < \tilde{R}_t$, the result is fed back to the energy management unit, requiring to increase a load reduction degree. Otherwise, the energy management unit keeps the current reduction unchanged, or the load of the carbon meter user is properly increased to realize a real-time dynamic carbon emission response of the carbon meter user and a dynamic adjustment of the carbon emission. This is more advantageous for low-carbon environmental protection. According to the embodiment of the present disclosure, the target carbon emission reduction is calculated, and the corresponding response demand is issued to the carbon meter user, such that it is advantageous for the power system to effectively adjust the carbon emission. In this way, the regulating capability for the carbon emission of the demand response technology is improved, and the low-carbon emission demand is met.

At block S207, data of the carbon meters on the carbon meter user side is uploaded.

At block S208, an emission reduction subsequent to the carbon response is calculated. The carbon emission reduction of each of the carbon meter users during the carbon emission response period is as follows:

$$\Delta F_i = R_i - \int_{t=T}^{T+1} R_{i,t} dt,$$

where $\Delta F_i$ represents a reduced carbon emission of the carbon meter user i during the carbon emission response period in unit of $kgCO_2$.

In the embodiment of the present disclosure, a subsequent emission reduction of the carbon meter user can be used as the basis for subsequent emission reduction compensation for a response behavior of the carbon meter user, thereby ensuring benefit of the carbon meter user.

The method for calculating carbon emission response based on carbon emission flows according to the embodiments of the present disclosure calculates a total carbon flow rate of a power system, and initiates carbon emission response based on the total carbon flow rate of the power system and in combination with target carbon emission response demand, such that indirect emission on energy usage of the carbon meter user can be easily obtained in real time. Furthermore, the carbon emission reduction subsequent to the carbon meter user response is calculated so that the carbon meter user is effectively guided to reduce the user's demand during a period of a high carbon emission intensity. Moreover, a reasonable implementation scheme is provided for a whole process of the carbon emission response, and thus an overall carbon emission level of the power system is effectively reduced. Therefore, it can solve the problems that since the actual carbon emission intensity on the demand side user cannot be obtained in the related art, the carbon emission cannot be effectively adjusted by the power system, such that the demand response technology has low carbon emission regulation capability, and the low-carbon emission demand cannot be met.

Next, an apparatus for calculating carbon emission response based on carbon emission flows according to the present disclosure is described with reference to the accompanying drawing.

Figure 4:
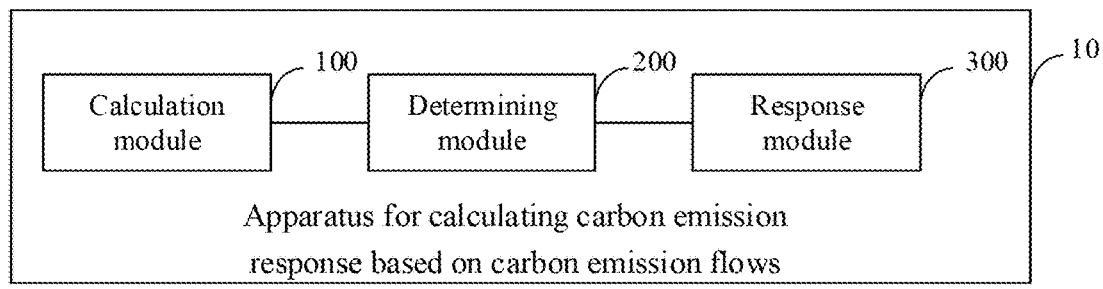
FIG. 4 is a schematic diagram of a structure of an apparatus for calculating carbon emission response based on carbon emission flows according to an embodiment of the present disclosure.

FIG. 4 is a schematic block diagram of an apparatus for calculating carbon emission response based on carbon emission flows according to an embodiment of the present disclosure.

As illustrated in FIG. 4, the apparatus 10 for calculating carbon emission response based on carbon emission flows includes a calculation module 100, a determining module 200, and a response module 300.

In an embodiment, the calculation module 100 is configured to calculate a total carbon flow rate of a power system from a carbon flow rate of each of carbon meter users. The carbon flow rate is obtained based on a carbon emission flow of each of the carbon meter users.

The determining module 200 is configured to determine whether the total carbon flow rate is greater than a carbon emission response threshold.

The response module 300 is configured to, as determining that the total carbon flow rate is greater than the carbon emission response threshold, calculate a target carbon emission reduction of one or more of the carbon meter users during a carbon emission response period based on target carbon emission response demand, and initiate a carbon emission response based on the target carbon emission reduction.

Optionally, in an embodiment of the present disclosure, the calculation module 100 includes a first calculation unit, an obtaining unit, and a second calculation unit.

The first calculation unit is configured to calculate the carbon emission flow of each of the carbon meter users based on a power flow, various power outputs, and a carbon meter user load of the power system.

The obtaining unit is configured to obtain a carbon emission intensity at a corresponding node of each of the carbon meter users in the power system based on the carbon emission flow of the carbon meter user, and determine a nodal carbon potential of each of the carbon meter users during the current period.

The second calculation unit is configured to calculate the carbon flow rate of each of the carbon meter users based on the nodal carbon potential of the carbon meter user to obtain the total carbon flow rate.

Optionally, in an embodiment of the present disclosure, a calculation equation of the carbon flow rate of each of the carbon meter users is:

$$R_i = e_i P_i, \forall i=1, \ldots, N,$$

where i represents a node, $e_i$ represents a carbon potential of an i-th (i=1, 2, ..., N) system node, N represents a total number of the carbon meter users, $R_i$ represents a carbon flow rate of a carbon meter user i that is defined as a carbon emission consumed by the carbon meter user due to energy usage at unit time and is expressed at $kgCO_2/h$, and $P_i$ represents an electric power of the carbon meter user i in unit of kW.

Optionally, in an embodiment of the present disclosure, a calculation equation of the target carbon emission reduction is:

$$\Delta F_i = R_i - \int_{t=T}^{t+1} R_{i,t} dt,$$

where $\Delta F_i$ represents a reduced carbon emission of the carbon meter user i during the carbon emission response period in unit of $kgCO_2$, $R_{i,t}$ represents a real-time carbon flow rate of the carbon meter user, and T represents a current moment.

Optionally, in an embodiment of the present disclosure, the apparatus 10 for calculating carbon emission response based on carbon emission flows further includes a threshold determining module. The threshold determining module is configured to determine the carbon emission response threshold based on a total installed capacity of a thermal power unit in the power system and an average carbon emission intensity of the thermal power unit.

It should be noted that the above description of the embodiments of the method for calculating carbon emission response based on carbon emission flows is also applicable to the apparatus for calculating carbon emission response based on carbon emission flows according to the embodiments, and details thereof are not repeated herein.

The apparatus for calculating carbon emission response based on carbon emission flows according to the embodiments of the present disclosure calculates a total carbon flow rate of a power system, and initiates carbon emission response based on the total carbon flow rate of the power system and in combination with target carbon emission response demand, such that indirect emission on energy usage of the carbon meter user can be easily obtained in real time. Furthermore, the carbon emission reduction subsequent to the carbon meter user response is calculated so that the carbon meter user is effectively guided to reduce the user's demand during a period of a high carbon emission intensity. Moreover, a reasonable implementation scheme is provided for a whole process of the carbon emission response, and thus an overall carbon emission level of the power system is effectively reduced. Therefore, it can solve the problems that since the actual carbon emission intensity on the demand side user cannot be obtained in the related art, the carbon emission cannot be effectively adjusted by the power system, such that the demand response technology has low carbon emission regulation capability, and the low-carbon emission demand cannot be met.

Figure 5:
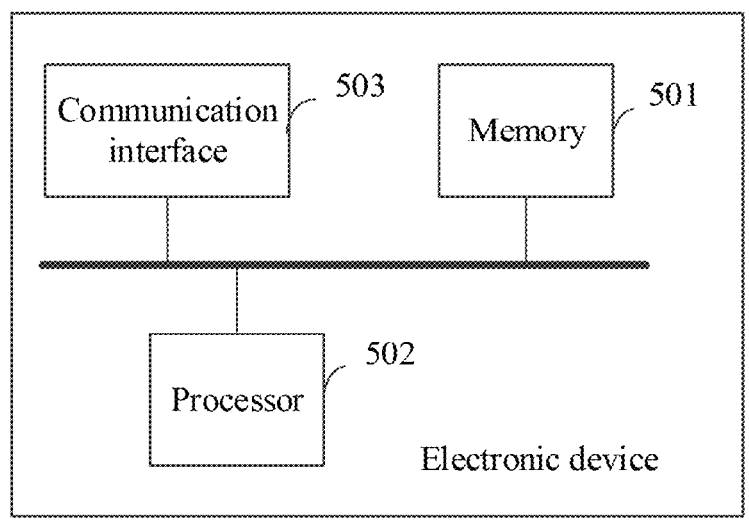
FIG. 5 is a schematic diagram of a structure of an electronic device according to an embodiment of the present disclosure.

FIG. 5 is a schematic diagram of a structure of an electronic device according to an embodiment of the present disclosure. The electronic device may include a memory 501, a processor 502, and a computer program stored on the memory 501 and executable on the processor 502.

The processor 502 is configured to execute the program to implement the method for calculating carbon emission response based on carbon emission flows according to the above embodiments.

Further, the electronic device further includes a communication interface 503. The communication interface 503 is configured to communicate between the memory 501 and the processor 502.

The memory 501 is configured to store the computer program executable on the processor 502.

The memory 501 may include a high-speed RAM memory, and may further include a non-volatile memory, for example, at least one magnetic disk memory.

When the memory 501, the processor 502 and the communication interface 503 are implemented independently, the communication interface 503, the memory 501 and the processor 502 may be connected to each other through a bus and communicate with each other. The bus may be an Industry Standard Architecture (ISA) bus, a Peripheral Component (PCI) bus, or an Extended Industry Standard Architecture (EISA) bus, or the like. The bus may be classified into an address bus, a data bus, a control bus and the like. For ease of illustration, only one thick line is used to represent the bus in FIG. 5, but it does not mean that there is only one bus or one type of bus.

Optionally, in an embodiment, when the memory 501, the processor 502 and the communication interface 503 are integrated on one chip, the memory 501, the processor 502 and the communication interface 503 can communicate with each other through the internal interface.

The processor 502 may be a central processing unit (CPU), an Application Specific Integrated Circuit (ASIC), or one or more integrated circuits configured to implement the embodiments of the present disclosure.

An embodiment further provides a computer-readable storage medium. The computer-readable storage medium has a computer program stored thereon. The program is configured to be executed by the processor to implement the method for calculating carbon emission response based on carbon emission flows described above.

In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Without contradiction, the different embodiments or examples and the features of the different embodiments or examples can be combined by those skilled in the art.

In addition, terms such as "first" and "second" are used herein for purposes of description and are not intended to indicate or imply relative importance or significance. Furthermore, the feature defined with "first" and "second" may include one or more this feature distinctly or implicitly. In the description of the present disclosure, "N" means at least two, for example, two or more than two, unless specified otherwise.

Any process or method described in a flowchart or described herein in other ways may be understood to include one or N modules, segments, or portions of codes of executable instructions for achieving specific logical functions or steps in the process. The scope of a preferred embodiment of the present disclosure includes other implementations. A function may be performed not in a sequence shown or discussed, including a substantially simultaneous manner or a reverse sequence based on the function involved, which should be understood by those skilled in the art to which the embodiments of the present disclosure belong.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device for including, storing, communicating, propagating or transferring programs to be used by or in combination with the instruction execution system, device or equipment. More specific examples of the computer readable medium include but are not limited to: an electronic connection (an electronic device) with one or N wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, N step or method may be realized by the software or firmware stored in the memory and executed by the appropriate instruction execution system. For example, if it is realized by the hardware, likewise in another embodiment, the steps or methods may be realized by one or a combination of the following techniques known in the art, such as a discrete logic circuit having a logic gate circuit for realizing a logic function of data signals, an application-specific integrated circuit having an appropriate combination logic gate circuit, a programmable gate array (PGA), and a field programmable gate array (FPGA).

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when executed on a computer.

In addition, each function unit of the embodiments of the present disclosure may be integrated in a processing module, or these units may be separate physical existence, or two or more units are integrated in a processing module. The integrated module may he realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for managing carbon emission response based on carbon emission flows, comprising:

calculating, by a central server, a total carbon flow rate of a power system from a carbon flow rate of each of carbon meter users, the carbon flow rate being obtained based on a carbon emission flow of the carbon meter user, each of the carbon meter users is equipped with a carbon meter and energy management unit;

determining, by the central server, whether the total carbon flow rate is greater than a carbon emission response threshold; and calculating, by the central server, in response to determining that the total carbon flow rate is greater than the carbon emission response threshold, a target carbon emission reduction of one or more of the carbon meter users during a carbon emission response period based on target carbon emission response demand, and for each of the one or more carbon meter users, sending carbon response demand information to the energy management unit of the carbon meter user based on the target carbon emission reduction of the carbon meter user;

wherein said calculating, by the central server, the total carbon flow rate of the power system from the carbon flow rate of each of the carbon meter users, comprises:

calculating, by the central server, the carbon emission flow of each of the carbon meter users based on a power flow, various power outputs, and a load of the carbon meter user of the power system;

for each of the carbon meter users, obtaining, by the central server, a carbon emission intensity at a node in the power system that corresponds to the carbon meter user based on the carbon emission flow of the carbon meter user, to determine a nodal carbon potential of the carbon meter user during a current period based on the carbon emission intensity;

for each of the carbon meter users, sending, by the central server, the nodal carbon potential of the carbon meter user to the carbon meter of the carbon meter user receiving, by the central server, the carbon flow rate that is calculated and sent by the carbon meter of each of the carbon meter users based on the received nodal carbon potential; and calculating, by the central server, the total carbon flow rate based on the carbon flow rate of each of the carbon meter users controlling, by the energy management unit of the carbon meter user, an electricity consumption load of the carbon meter user based on the carbon response demand information.

2. The method according to claim 1, wherein the carbon flow rate of each of the carbon meter users is calculated according to an equation below:

$$R_i = e_i P_i, \forall i=1, \ldots, N,$$

where i represents a node, $e_i$ represents a carbon potential of an i-th (i=1, 2, ..., N) system node, N represents a total number of the carbon meter users, $R_i$ represents a carbon flow rate of a carbon meter user i in unit of $kgCO_2/h$ that is defined as a carbon emission consumed by the carbon meter user due to energy usage at unit time, and $P_i$ represents an electric power of the carbon meter user i in unit of kW.

3. The method according to claim 2, wherein the target carbon emission reduction is calculated according to an equation below:

$$\Delta F_i = R_i - \int_{t=T}^{T+1} R_{i,t} dt,$$

where $\Delta F_i$ represents a reduced carbon emission of the carbon meter user i during the carbon emission response period in unit of $kgCO_2$, $R_{i,t}$ represents a real-time carbon flow rate of the carbon meter user, and T represents a current moment.

4. The method according to claim 1, wherein the method further comprises, before said determining whether the total carbon flow rate is greater than the carbon emission response threshold:
determining, based on a total installed capacity and an average carbon emission intensity of a thermal power unit of the power system, the carbon emission response threshold.

5. One or more electronic devices, each comprising:
a memory;
a processor; and
a computer program stored on the memory and executable on the processor,
wherein the processor is configured to execute the program to implement the method for managing carbon emission response based on the carbon emission flows according to claim 1.

6. The electronic device according to claim 5, wherein the carbon flow rate of each of the carbon meter users is calculated according to an equation below:

$$R_i = e_i P_i, \forall i=1, \ldots, N,$$

where i represents a node, $e_i$ represents a carbon potential of an i-th (i=1, 2, ..., N) system node, N represents a total number of the carbon meter users, $R_i$ represents a carbon flow rate of a carbon meter user i in unit of $kgCO_2/h$ that is defined as a carbon emission consumed by the carbon meter user due to energy usage at unit time, and $P_i$ represents an electric power of the carbon meter user i in unit of kW.

7. The electronic device according to claim 6, wherein the target carbon emission reduction is calculated according to an equation below:

$$\Delta F_i = R_i - \int_{t=T}^{T+1} R_{i,t} dt,$$

where $\Delta F_i$ represents a reduced carbon emission of the carbon meter user i during the carbon emission response period in unit of $kgCO_2$, $R_{i,t}$ represents a real-time carbon flow rate of the carbon meter user, and T represents a current moment.

8. The electronic device according to claim 5, wherein the method further comprises, before said determining whether the total carbon flow rate is greater than the carbon emission response threshold:
determining, based on a total installed capacity and an average carbon emission intensity of a thermal power unit of the power system, the carbon emission response threshold.

9. One or more non-transitory computer readable storage media, the one or more computer readable storage media each having a computer program stored thereon, wherein the program is configured to be executed by a processor to implement the method for managing carbon emission response based on the carbon emission flows according to claim 1.

10. The non-transitory computer readable storage medium according to claim 9, wherein the carbon flow rate of each of the carbon meter users is calculated according to an equation below:

$$R_i = e_i P_i, \forall i=1, \ldots, N,$$

where i represents a node, $e_i$ represents a carbon potential of an i-th (i=1, 2, ..., N) system node, N represents a total number of the carbon meter users, $R_i$ represents a carbon flow rate of a carbon meter user i in unit of $kgCO_2/h$ that is defined as a carbon emission consumed by the carbon meter user due to energy usage at unit time, and $P_i$ represents an electric power of the carbon meter user i in unit of kW.

11. The non-transitory computer readable storage medium according to claim 10, wherein the target carbon emission reduction is calculated according to an equation below:

$$\Delta F_i = R_i - \int_{t=T}^{T+1} R_{i,t} dt,$$

where $\Delta F_i$ represents a reduced carbon emission of the carbon meter user i during the carbon emission response period in unit of $kgCO_2$, $R_{i,t}$ represents a real-time carbon flow rate of the carbon meter user, and T represents a current moment.

12. The non-transitory computer readable storage medium according to claim 9, wherein the method further comprises, before said determining whether the total carbon flow rate is greater than the carbon emission response threshold:
determining, based on a total installed capacity and an average carbon emission intensity of a thermal power unit of the power system, the carbon emission response threshold.

* * * * *